May 16, 1967 W. KOBER 3,320,454

ALTERNATING CURRENT GENERATOR

Original Filed May 3, 1962

INVENTOR.
WILLIAM KOBER
BY Christel + Bean
ATTORNEYS

May 16, 1967 W. KOBER 3,320,454
ALTERNATING CURRENT GENERATOR
Original Filed May 3, 1962

INVENTOR.
WILLIAM KOBER
BY
Christel + Bean
ATTORNEYS

INVENTOR.
WILLIAM KOBER
BY Christel + Bean
ATTORNEYS

United States Patent Office 3,320,454
Patented May 16, 1967

3,320,454
ALTERNATING CURRENT GENERATOR
William Kober, Rolling Hills, Calif., assignor, by mesne assignments, to The Garrett Corporation, Los Angeles, Calif., a corporation of California
Continuation of application Ser. No. 192,122, May 3, 1962. This application Feb. 10, 1966, Ser. No. 529,693
14 Claims. (Cl. 310—268)

This invention relates generally to the electrical art, and more specifically to a new and useful alternating current generator. This application is a continuation of my pending application Ser. No. 192,122, filed May 3, 1962 which is a continuation-in-part of my pending application Ser. No. 770,029 filed Oct. 28, 1958, now abandoned.

The primary object of this invention is a novel construction of an alternating current generator which makes possible a large increase in capacity per unit weight and cost, and a very large reduction in power losses, producing a machine much easier to cool.

An alternating current generator constructed in accordance with my invention is characterized by the provision of opposed field producing structures substantially eliminating the transmission of flux between poles.

These and other objects, characterizing features and advantages will be explained in the following specification and drawings, which latter are essentially diagrammatic, wherein.

Figure 1:
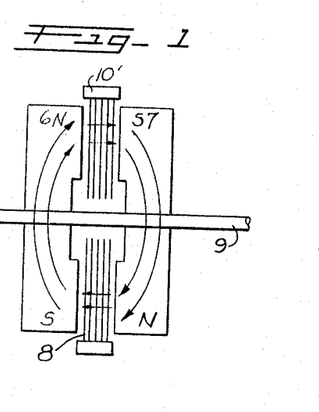
FIG. 1 is a longitudinal section view of the basic alternator construction of this invention.

FIG. 1 shows the basic plan of this invention. It takes the form of an axial air gap, but in this embodiment there is no stator iron at all. The two fields 6 and 7 face each other across air gap 5. They now face, between 6 and 7, across the relatively short distance 5 required to accommodate winding 8, which obtains no support from stator iron and so requires other methods of support which will be described later, but may be indicated by frame 10'. The winding 8 may or may not contain stator-type teeth, and this matter will also be described later.

Thus, the distance between poles and the transmission problem has disappeared. Material and energy loss have been eliminated, since now there is either no iron at all, or the small amount in teeth only, that carries alternating flux. The flux in 6 and 7 is substantially constant. Nothing has been lost in the field system however. In permanent magnets, length is needed to develop M.M.F., and this length can be as efficiently or even more efficiently developed by dividing it into the two path systems 6 and 7. In fact, unwanted leakage paths are reduced by making each part 6 or 7 with only half the needed M.M.F. per pole. In an electromagnet type, the field winding, whether concentrated or distributed, also requires length to develop, and here again nothing is lost, and a better leakage situation is gained, by splitting the field into two parts. In large machines, the diameter of the field, and centrifugal stresses in it, are reduced by making up the field out of two parts.

In this invention, it will be observed that the length required to develop M.M.F. simultaneously replaces the usual passive flux return path and provides the radius necessary to produce motion upon rotation.

It is now important that, according to the invention, practically the entire stator iron has been eliminated, with its weight, bulk, energy loss, cooling problem, and cost. The presence of stator iron also greately increases reactance, because it constitutes a highly permeable mass in the neighborhood of the windings. All these advantages are obtained at no sacrifice whatever in function of the other parts. Basically, this has been done by bringing the N–S field producing poles close and opposed physically. It is true that now there are two field systems, but each is smaller than that for the conventional machine, and the two may be made in the same way, thus simplifying manufacture.

In smaller machines, where the M.M.F. per pole is normally low, tooth iron may be retained in the air gap with the windings to permit a high flux density.

In larger machines, or in those using permanent magnets of high M.M.F., it is advantageous to eliminate the tooth iron entirely. Such elimination reduces the permeability of the air gap 5, but it provides more room for the working conductors. Without teeth, higher working densities in the air gap become possible. In some cases, the working density can go to a saturation density for the pole material N, S, and so far exceed the maximum density available in conventional types since the copper of the winding and the iron of the teeth must divide the available space.

It will be evident from the above that the invention makes possible a great increase in performance per unit cost and weight by presenting new arrangements of field and winding for an alternating current generator. The new conformation poses new problems of mechanical design, whose solution is a part of the whole invention.

Figure 3:
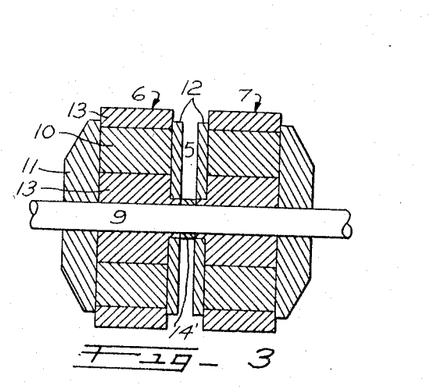
FIG. 3 is a detail longitudinal sectional view of a permanent magnet field structure of the invention.
Figure 4:
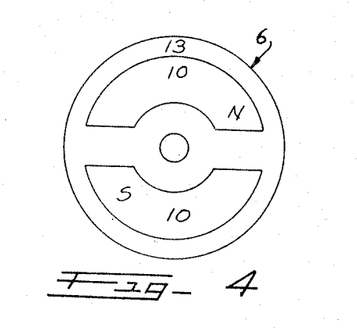
FIG. 4 is an end elevational view of the field structure of FIG. 1.

Methods of construction of the field will now be shown. In FIGS. 3 and 4 are shown a form of field suitable for permanent magnets. The shaft which supports the two field structures 6 and 7 and supplies mechanical power to the generator is shown at 9. Field structures 6 and 7 are suitably mounted on the shaft to maintain position both longitudinally and rotationally. A collar 14' to act as a spacer may be part of the shaft or in the form of a ring fitting over the shaft, to maintain spacing of the air gap. Here, 11 is made of steel with a high flux conducting capacity, and acts as a return magnetic circuit for magnets 10. Pole pieces 12 may or may not be required. Part 13 supplies mechanical strength and in many cases, where magnet protection is required, is made of a material of high electrical conductivity, for the reasons explained in my Patent 2,719,931. FIG. 4 shows a face view of 6 of FIG. 3 with the pole pieces removed, showing a 2 pole sector shaped magnet design. This construction is similar to that shown in my Patent 2,719,931, except that the fields 6 and 7 face each other across air gap 5, the N of 6 facing the S of 7 to produce the combined maximum of M.M.F. in the air gap 5.

As will be clearer when the winding structure is described, it is preferred that one field structure such as 6 be readily removed endwise from the shaft, so that the winding, which in many cases is an assembly looking like a disc with a clearance hole for shaft 9 and collar 14 can be inserted, and then part 6 refastened in proper position.

Magnets 10 in FIG. 4 are shown in shapes which are often suitable to 2 pole structures, but sector shapes in multi-pole machines, or other shapes in 2 pole machines are also advantageous in certain applications and with certain materials.

Figure 5:
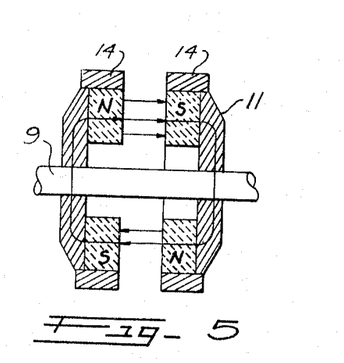
FIG. 5 is a longitudinal sectional view like FIG. 3, but of another modification.
Figure 6:
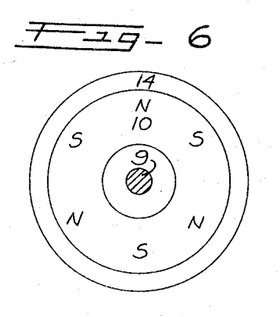
FIG. 6 is an end elevational view of the field structure of FIG. 5.

Of special interest in certain generator problems is the use of high-coercive low density magnet materials, such as "dust" and "ceramic" compositions. Many of these materials have such characteristics as to be stable in magnetic performance even under short-circuit conditions of the generator they are in. A relatively short magnet length is sufficient to produce a M.M.F. in the air gap capable of developing an optimum winding and magnet performance. Such a consideration, illustrated in FIGS. 5 and 6, favors the magnetic return circuit 11 shown for FIG. 3, since enough length is readily developed in the thickness of the annular magnet 10, and the density in the magnet is so low as to make transmission by the high density magnetic circuit element 11 economical in terms of weight. Such a magnet structure is readily made up by compacting the material against the steel or iron plate 11 during manufacture in a continuous ring. Any desired number of poles may be formed in the process of magnetization, the material at the dividing point between N and S poles producing flux in a circumferential direction, and so being of use. Ring 14 helps support material 10 against centrifugal force in cases where this becomes large.

Tooth iron as described, is used in small machines, or generally when the field M.M.F. between poles is not great enough to get a sufficient density in the air gap for the desired design purpose. The tooth iron is otherwise not beneficial, as it has magnetic losses, requires slot insulation (even with dust types), and must be more strongly mounted as it is subject to considerable mechanical force due to the interaction of the field and the tooth iron. The tooth iron also reduces the available space for the winding conductors, and in turn the conductor space and the saturation limit of the tooth put a maximum on the working flux. The permeability of the tooth matreial also increases slot reactance, and through this, total reactance, and reactance increase is usually harmful to performance.

Thus, in many cases, it is preferable to use no permeable material at all in the air gap.

Figure 7:
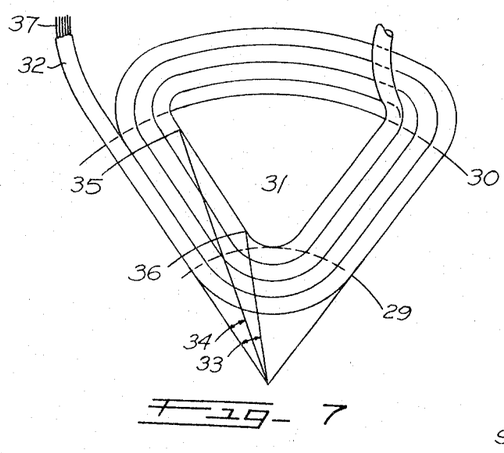
FIG. 7 is a fragmentary elevation of a single phase winding related to one field pole.

For a single phase winding, a unique pattern develops. When an air conductor winding is required, a new possibility appears. In FIG. 7, 31 shows one field pole of a 4 pole machine, the field having an outer diameter 30 and an inner diameter 29. These diameters may represent the extent of magnetically active material, or also be the physical limits of a salient part of the field structure. Winding 32 is of rectangular cross-section, and insulated all around or by an insulating film wound in place with the wire. This coil is wound on a core having the shape of the inside of the coil, and so chosen to give the outside of the coil the proper shape, to substantially fill the quadrant embraced by the pole, and in general to cover the most flux with the minimum length of conductor. The width of the build up at 35 is about the same as at 36, but the arcs 34 and 33 represented are quite different, for obvious geometrical reasons evident from the drawing. Thus, the belt-pitch of the winding is smaller toward the larger diameters. It is possible to make the belt-pitch at 36 much wider than would be possible otherwise, because the corresponding value about 35 is much lower, and a larger amount of flux is still included in the smallest coil. In conventional single phase windings, the smallest coil covers about ⅓ the area included in the total pole area, and this is about the point of diminishing returns. With the pattern of FIG. 7, it will be seen that the smallest coil may cover the entire pole pitch at the minimum diameter, and still include more than ⅓ of the total pole area. The key is the non-radial course of the side elements of the inner coils. The close winding at all points permits cementing of the coil into one mechanical unit, and also permits the more efficient disposition above described. This coil form is now a new shape uniquely effective with the new field flux pattern of the invention.

In any air-conductor stator, the field magnetic flux density through the conductor itself is high. Thus eddy currents are created in the section of the conductor. The problem is very similar to the familiar one of eddy currents in the stator iron of conventional generators, and is solved in the same way, by lamination. However, since the conductor material, copper, aluminum or other highly conductive substance, has an electrical conductivity much greater than that of magnetic steel sheet, these eddy currents are more harmful, and in general, for a given magnetic flux density and frequency, a thinner lamination of the conductor is indicated than normally found in steel sheets.

Figure 8:
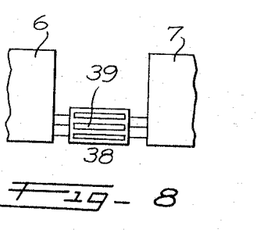
FIG. 8 is a transverse section of a conductor of the winding of FIG. 7.

Thus a conductor 32 in FIG. 7 is not a piece of bus bar, but numerous layers of copper ribbon, as shown in FIG. 8. The ribbons of one conductor require insulation at all touching surfaces. However, the grade of insulation need not be high, as contacts from point to point cause little harm unless they are very numerous and extensive. This factor is also similar to the inter-sheet insulation of magnetic steel. A thin insulating sheet material between laminations will serve to break up the substantial body of eddy current paths, even if a number of faults normally appear. The plane of the laminations must always be such as to be thin in the direction of a field flux line, as shown in FIG. 8.

Figures 9, 10, 11, 12, 13, 14, 15:
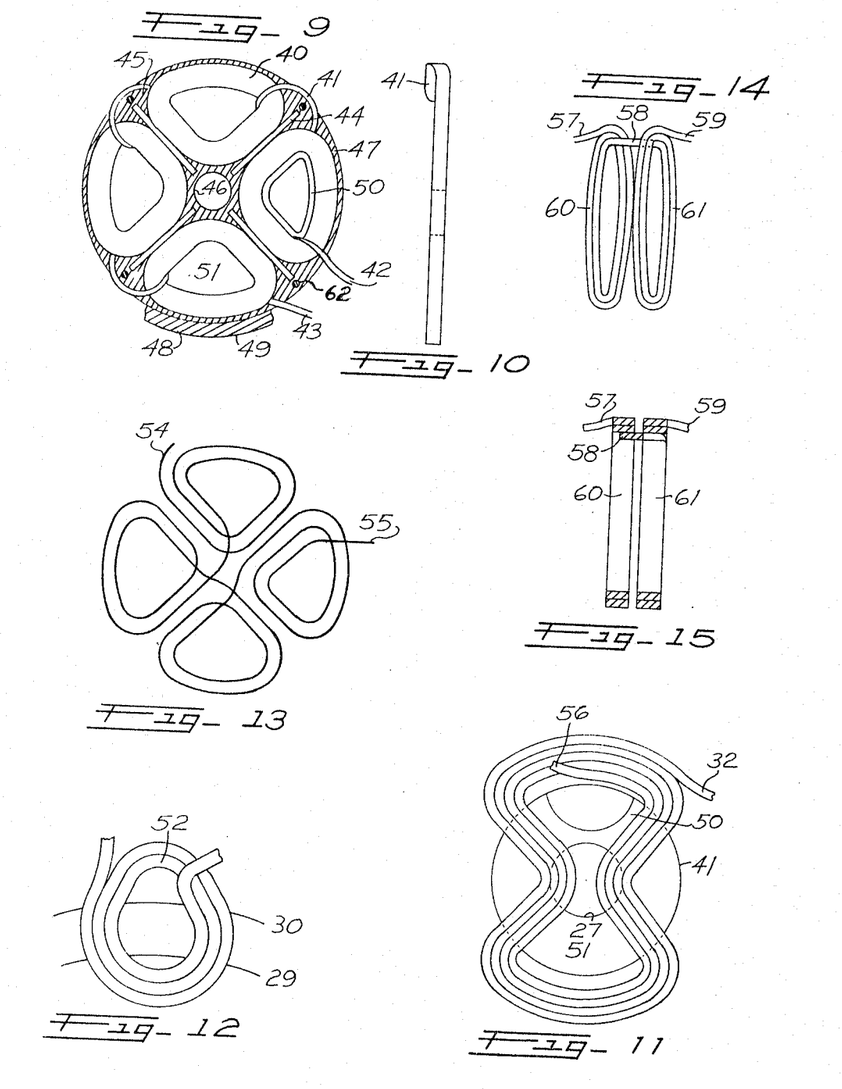
FIG. 9 is an elevation, partly in section, of the four coils of a four pole, single phase stator.
FIG. 10 is an elevation of the leads which interconnect the coils of FIG. 9.
FIGS. 11–14 are views of other winding arrangements.
FIG. 15 is a section of the winding of FIG. 14.

FIG. 9 shows a method of mounting the four coils of a four pole single phase stator. An interpole insulating strip of glass-cloth plastic, for example, is shown at 44, to protect the coil parts against the coil-to-coil voltage which is of course higher than the voltage between adjacent conductors in one group as in FIG. 7. The coil-spacer assembly is now formed and filled with a suitable plastic or other bondable insulating material into a flat plate, having a hole 46 in the center for shaft clearance and an outer limit 47. The whole may also be made up of a ring of similar insulating material shown at 48, which sets as a wall for the control of material 45 and also has substantial strength. Part 48 is at all points well away from field flux and so may be made of metal. Aside from the projection of the intercoil connection 41 the result is substantially a flat plate with a small hole in the center and an approximately circular outer diameter. Cores with hollow centers, as 50 or solid as 51 may be left in the coil centers to increase rigidity.

FIG. 11 shows another way of making the single phase stator, in one continuous winding. It is not symmetrical as the four coil method of FIG. 7, and is somewhat harder to form, but it has the advantage of having no projections like 41. The conductors must be laminated as before. Solid cores 51 and hollow cores 50 may be provided as before, and the whole cemented into a flat plate, which however will retain a figure eight appearance rather than becoming circular.

The leads interconnecting the coils 41 in FIG. 9 came out of the central part of the coil, and project as shown in FIG. 10. The point at which the lead 41 emerges from the flat coil structure should be above the outer diameter 30, FIG. 7 of the field pole face, and hence there is lateral room for this projection. If necessary, the outer part of the coil can be pushed upward, as at 52 in FIG. 12 to insure clearance. Some or all of the connections may also be made on the inner part of the coil, where lateral room is available inside the inner diameter 29, FIG. 7 of the field pole faces. FIG. 13 shows a pattern of connecting the coils with most of the interconnections in the inner region. Instead of using the coil conductor itself for the interconnection 41, a flat ribbon (braided to avoid eddy current losses in the field) may be used to join the coils conductively.

The method of FIG. 11 requires no actual interconnections, although there is one terminal 56 coming out from the inner side of the coil. There is one way to secure a perfectly flat coil. In FIGS. 14 and 15, each coil assembly consists of two actual coils of half width side by side. The conductor (which is laminated, but shown only as a unit) starts at lead 57 and spirals inward, then at 58 crosses to the other coil, still spiralling, and now winds outward, terminating at 59. All the coil terminals now are on the outside of the coil, and connections can be made on the outside without lateral projections.

Figures 16, 20:
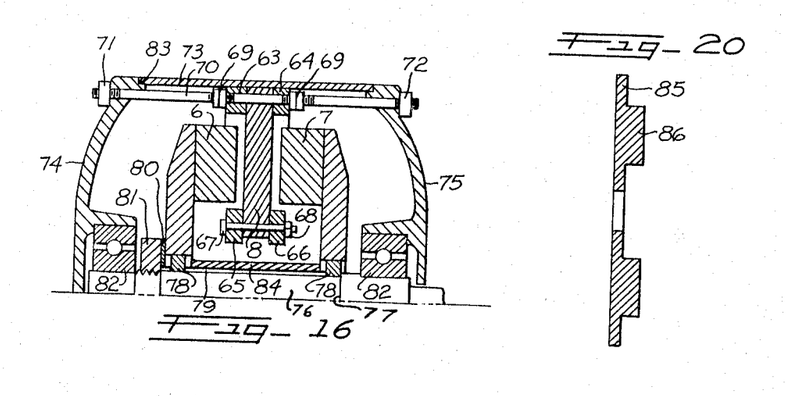
FIG. 16 is a fragmentary, longitudinal section of a complete generator of the invention.
FIGS. 20 and 21 are transverse section and end elevation views of a stator end plate.

FIG. 16 shows the construction of a complete generator, combining the fields and stators in a complete unit. The mounting problems solved in this construction will also help in understanding further structural detail of the stator which will follow. The generator of FIG. 16 uses a "powder" magnet of high coercive force and moderate induction, and the field parts are of the type described in FIGS. 5 and 6. Part 8 is a stator without permeable teeth, such as that of FIG. 9. Such a stator has no forces on it except those of interaction between stator winding currents and the magnetic field, and these forces are almost entirely rotational, tending to drag the stator along with the rotor. Only minor lateral forces on the coil are produced. The mounting of the stator is however preferably one in which the winding 8 can be positioned in the interpole space with a safe mechanical clearance on either side, and uniform over the entire pole face area, from inside to outside and over the entire 360°. The way in which this result is obtained will appear from the following description of FIG. 16.

The two field parts 6 and 7 are mounted on shaft 76, which has one or more key slots 79. In assembly, shaft 76 first has field part 7 slipped on, against shoulder 77, and held against rotation by key 78, which fits in a key slot in part 7 and also into shaft key slot 79 in the usual manner. Spacing collar 84 is then slid into place. Now stator 8 is placed in position over collar 84, followed by field part 6 and its key 78. Lock washer and nut 80 and 81 are next installed, holding field parts 6 and 7 in proper relation and keyed against rotation on the shaft. Bearings 82 are next placed on shaft 76, and housing 73 placed over the rings 63 and 64, which it fits snugly. Bells 74 and 75 are now put in place against rabbets 83, with the ends of studs 70 passing through holes in the bells. Nuts 71 and 72 not only hold the end bells in operational position, but also adjustably position stator 8 with proper clearance and in square position between the pole faces of fields 6 and 7.

Figure 17:
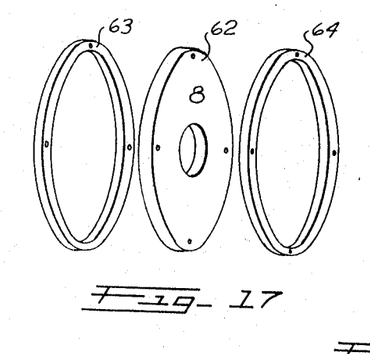
FIG. 17 is an exploded perspective view of the stator of FIG. 16.

Stator 8 is the same as that shown in FIG. 9. Rings 63 and 64 are clamped against either side of stator 8, as shown in FIG. 17, and studs 70 are then passed through the four holes 62 of FIGS. 9 and 17. Nuts 69 are run up on stud 70, clamping rings 63 and 64 against the side of stator 8. The studs pass through holes 62, which preferably (see FIG. 9) are placed between coils, and so may be well below the diameter of most of the stator end turns. Rings 63 and 64 help to grip stator 8 and hold it flat. The material may be an insulator, such as plastic or ceramic, or a metal with a good insulating surface coat. In many designs, very little field magnetic flux reaches rings 63 and 64 and they may then be made of metal. In fact, a highly conducting metal in this part will tend to resist penetration by armature leakage flux from the stator winding, and so act to reduce the reactance of the generator, which is usually beneficial.

Rings 65 and 66 may be installed in a similar way on the inside edges of the stator 8, being clamped thereagainst by bolts 67 and nuts 68. They help to strengthen the stator, and hold it flat and rigid. In fact, with inner rings 65, 66 and outer rings 63, 64 in place, it is possible to place the intermediate approximately radial coil material in tension, which will further stiffen and flatten the stator 8.

The adjustable feature of FIG. 16 is more important with a stator containing permeable teeth, as then lateral forces arise, and also in general, clearance gaps between stator and hole face are smaller.

When clearances are fairly large, the adjustable device on stator 8 may not be needed, and the ring 63 or 64 can be clamped against a shoulder in housing 73, or even one located in end bells 74 or 75, using studs 70 shortened or replaced by screws or bolts.

Figure 18:
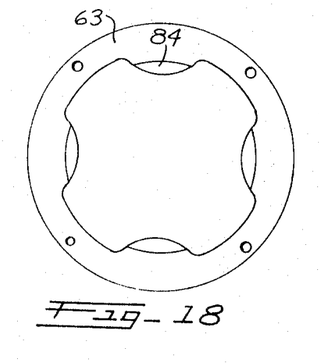
FIG. 18 is an end elevation of a modified stator ring.
Figure 19:
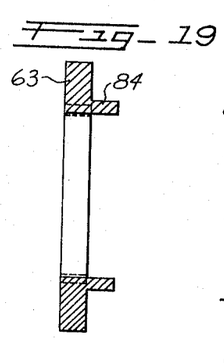
FIG. 19 is a transverse section thereof.
Figure 21:
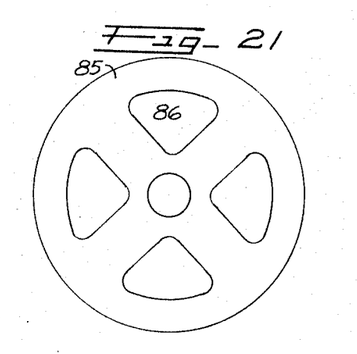

Rings 63 and 64 may have shoulders 84, FIG. 18, projecting into a space inside the coil, in the area shown at 50, FIG. 9. Inside rings 65 and 66 may be treated similarly. Such projections help to keep the coils in tension when this is desired as described above.

When the coil voltage is high, or for mechanical reasons, insulating sheets of suitable material may be placed on each side of stator 8. These can also help to stiffen and flatten the stator 8, used with or without rings 63, 64 and rings 65, 66 of FIG. 16. These sheets may be placed in tension between the inner and outer rings, in the same manner as a drumhead, to further support the coils of stator 8.

The coils may be held more firmly if end plates like that of FIG. 20 are used. Here 85 is a flat part, and 86 is a core part made of insulating material. The core part 86 fits into a coil such as 40 of FIG. 9 in place of core 50 or 51. Two such end pieces may be placed on either side, as in FIG. 22, and held by cementing, or rings 63, 64, 65, 66 of FIG. 16, or by fastening through the core, as shown at 87, 88 and 89. The plates and cores may be made separately and held together by suitable means, or they may be formed as a unit.

A polyphase winding may be made up of single phase windings as in FIG. 9 placed side by side, each set forming one phase, and as many sets being used as there are phases. The coils in the different phases naturally are displaced the proper number of electrical degrees. Thus, in a two-phase generator, two sets of coils as in FIG. 9 are placed side by side, displaced 90 electrical degrees or in the case of a 4 pole machine, 45 mechanical degrees. For a 3 phase machine, three coils are placed side by side.

The coil arrangements and mountings have been illustrated mainly by a 4 pole system, but the structures are readily adapted to any other pole number.

Figure 25:
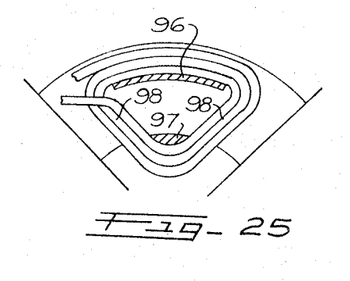
FIG. 25 is a view of a modified support.

Two pole windings are, however, somewhat different in pattern, and one special way of supporting a two-pole winding requires description. In FIGS. 23 and 24, 90, 91 represents a framework of insulating material which acts as a form to hold each coil 5' of the two coil set. The coil rests on the cylindrical spool part 90 for substantially 180°, with only the part entering the magnetic field region unsupported. This part is rigid, however, by being in tension, so that all of the coil is in effect rigidly supported. Parts 91 of the frame act as side supports for a large part of the coil, and also give it strength, since the thickness at 90 must be kept small to keep the mean turn length of the coil small. The frame 90, 91 may be one piece, or preferably two halves dovetailing to keep them in line. Parts 91 also serve as a suitable attaching point for mounting the coil in proper position. To keep the conductor parts 94 from moving into the shaft area, and to further stiffen them, a spacer 92, 93 may be inserted between coils. The coil form 90, 91 may also be stiffened by placing rib 95, no wider than the coil, in the area inside each coil 5', in a manner and for a purpose similar to that of cores 50 or 51 of FIG. 9. The general construction above is suitable for large generators, where extensive coil support is required. On close study of FIG. 25, similarity to some of the multipole structures already described will become more apparent. In the multipole form, the part of the conductor 98 which enters the restricted region between magnetic pole faces is also in tension, and form 96 has a shape similar to that for FIGS. 23 and 24. Center part 97 now must pull the coil toward the center, balancing pull on all the coils, and acting to provide the tension in part 98. The similarity to previously shown multipole structures is readily seen.

In permanent magnet field generators, means for varying the voltage, either manually, under control of an external regulator, or automatically as a result of internal forces in the generator, are often required.

For a common shaft system, such as FIG. 16, shims may be placed at either end of spacer tube 84 for a manual control requiring of course stopping of the rotation for each adjustment. The shims may be T shaped for easy insertion and removal.

Fields 6 and 7 have until now always been placed with north poles on one exactly opposite to south poles on the other. If the fields are rotated relative to each other away from this position, the magnetic field in the gap is weakened and a displacement of 180 magnetic degrees, bringing north to north and south to south will bring the field to nearly zero. Thus, it is possible to control the working field, and thus the stator voltage by rotating one field with respect to the other.

Manual adjustment, with the generator not running may be made in FIG. 16 by removing key 78 from field 6, and holding field 6 in suitable angular displacement with respect to field 7 by friction of the assembly pressure of collar 84 and nut and washer 80, 81. A more positive positioning is achieved by cutting 4 splines in the shaft under the region where field 6 is attached, and 5 splines in the mating part of field 6. This will give 4×5=20 positions, at intervals of 360/20=18°. It is preferred to use half-round grooves, and a larger number of these, say 12 on the shaft and 13 on the field 6, giving 12×13 or 156 positions, or steps of 2.3°. The grooves are too short to permit the pin shaped key from moving out of poistion inward and the pin is blocked on the outward side by washer 80 and nut 81.

The same principles described for permanent magnet fields also hold for electromagnet field alternators. In small capacity generators the field magneto motive force that can be designed is small and stators with permeable teeth are preferred. In larger sizes, the field M.M.F. becomes quite large and the all-conductor stator types give better performance.

Figure 26:
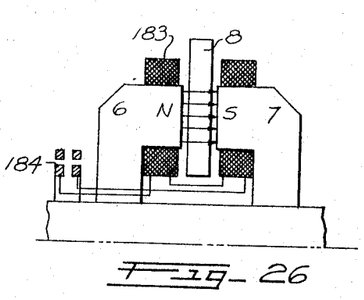
FIG. 26 illustrates a four-pole electromagnet generator of the invention.
Figure 29:
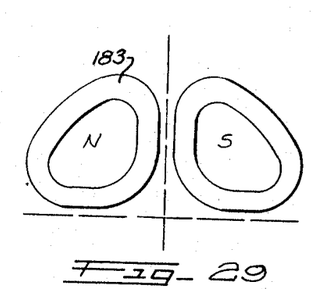

FIGS. 26 and 29 show an arrangement for a 4 pole electromagnet generator. The construction is similar to that of the permanent types already described, except that the pole faces require a winding 183 to excite them. The direct current for excitation is supplied from an external source through brushes and slip rings 184, or in any other manner known to the art. All the stator systems previously described may be used. When using electromagnets, it is usual to control voltage by field current control, and the regulation systems described for permanent magnets are not needed. They may however be used either with or without field current control.

In large generations, the electromagnet system has an advantage over permanent magnet types using present materials. The air gap flux density can be taken up to 21,000 c.g.s. units, the saturation level of magnetic iron, or even higher with certain cobalt-steel alloys. The high-density produces small size and weight and high performance.

Figure 27:
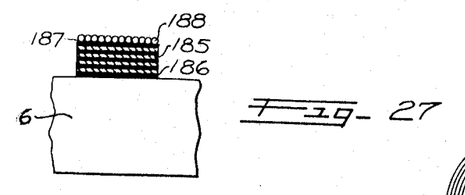
FIGS. 27, 28 and 29 illustrate details of the field windings of FIG. 26.
Figure 28:
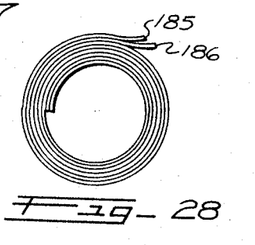

The field windings may be made up of round or rectangular wire. However, it is preferred to wind a pole such as in FIG. 26 with a ribbon of thin copper sheet 185, with an insulating sheet 186 applied to one side and wound with it to provide continuous insulation, as shown in FIGS. 27 and 28. The conductor is of hard rolled copper sheet or of aluminum alloy to give conductivity and strength when the machine is large and centrifugal forces are great. It is often preferred to cover the coil with a final insulating cover 187 and then wrap high strength non-magnetic wire over the whole to help support it against centrifugal force.

In the foregoing, the field systems have all been of an axial-air-gap type. This method is preferred because the field parts are physically identical, and the symmetrical arrangement restricts leakage magnetic fluxes.

Figure 30:
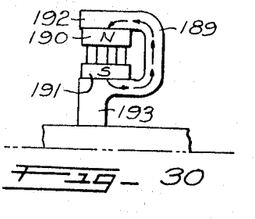
FIGS. 30 and 31 illustrate a cylindrical or radial air gap generator of the invention.
Figure 31:
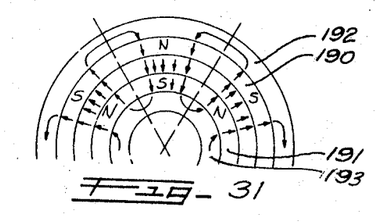

In some cases, however, space or other considerations do not permit the use of an axial-air-gap. The invention can be produced with cylindrical or even conical gaps if desired. FIGS. 30 and 31 show a cylindrical air gap multipole machine according to the invention, using permanent magnets 190, 191. Ring 192 and 193 must be magnetically permeable, and portion 189 may be of the same material or some non-magnetic material, as in a multipole machine it is not in the return magnetic circuit.

Figure 32:
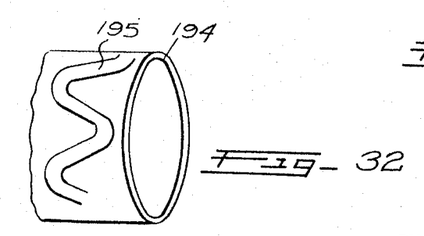
FIG. 32 is a view of an armature winding, and support therefor, for the generator of FIG. 30.

A winding and support for such a machine are shown in FIG. 32, 194 is a tube of insulating material on which ribbon winding 195 is supported. Winding 195 may also be made of round or rectangular wire. As shown, the winding is of wave-type, but a coil type winding may also be employed. The tube 194 and its winding are supported by the housing of the generator, not shown, in between magnet N, S of FIG. 30, with the end not quite reaching 189. It will be appreciated that aside from the loss of duplication of the two fields, and minor geometrical changes in coils and coil supports, that all the principles and methods explained for the axial air gap apply to the cylindrical system. The air gap can also be made conical, in which case it is only necessary to remove the upper part 192, FIG. 30 to insert the conical tube 194 and winding. The conical shape poses no new problems not readily solved from the axial-air-gap structures shown.

In windings according to the invention, when teeth are used, whether permeable or not, the slots take a substantially radial course. In FIG. 7, the conductor-insulator type deviates somewhat from this pattern, but the outer portions of the coil are quite long.

Figure 33:
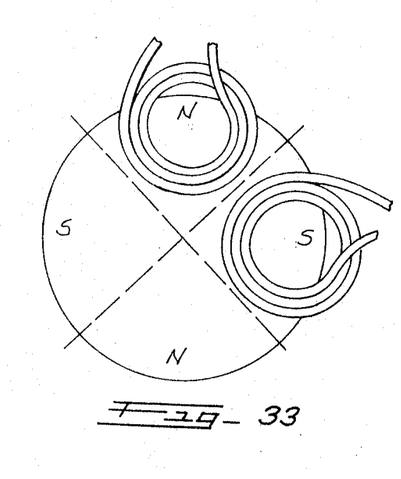
FIGS. 33–37 illustrate other winding arrangements for generators of this invention.

It is often preferred to use a coil shape still more deviant from the radial direction in the field region. FIG. 33 shows such a pattern. The criterion here is to secure for the average turn a maximum flux inclusion with a minimum of length. The long corners of FIG. 7 are cut and rounded.

Figure 34:
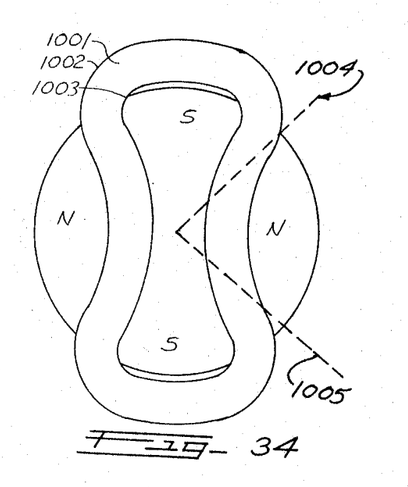
Figure 35:
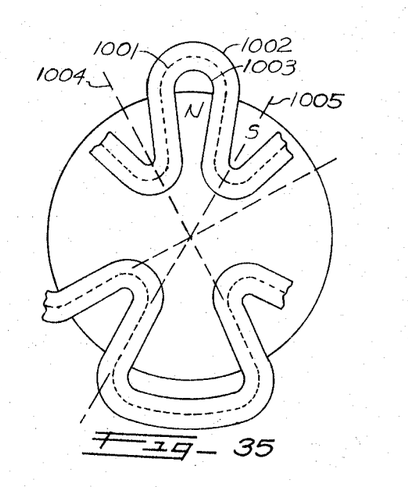

The modified coil form shows to best advantage in the winding style of FIG. 11, which shall hereafter be called winding-style of FIG. 11, which shall hereafter be called a wave-type winding, an expression not current in the art and used here for convenience. Lines 1004 and 1005 (FIG. 34) define the neutral regions between the four poles. The outside of the coil is shown by outline 1002 and the inside by 1003. The mean turn is indicated by dotted lines 1001 (FIG. 35). Comparison with FIG. 11 shows the coil to be shorter in the crossing of the field region, and most markedly shorter in the ends. The mean turn of FIG. 34 crosses lines 1004 and 1005 at a considerable angle, while in FIG. 11 it is substantially coincident with them over the pole area. A considerable saving in mean turn is effected, while only a minor loss of included flux results.

FIG. 35 shows the arrangement with numerous poles, the upper coil style being formed as described, the lower one with the mean turn more or less along neutral lines 1004, 1005, etc.

Figure 36:
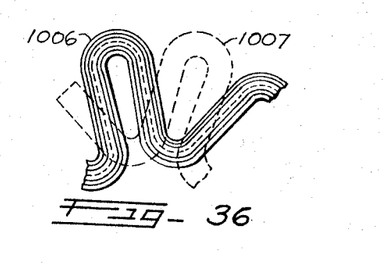
Figure 37:
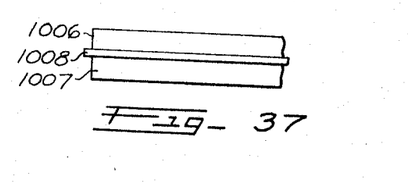

If a winding is made up of two windings 1006 displaced one pole pitch, and laid side by side, the result of FIG. 36 is obtained. It will be remembered that the coil 1006 is made up of many thin sheets of copper, with planes parallel to the direction of the field flux to reduce eddy currents in the conductors. Thus, the coil is fairly stiff laterally, but bends readily in the layered direction. The second coil 1007 at an angle where the two coils pass, and when the coils are cemented together, either with or without an insulating plate 1008 (FIG. 37), they serve to strengthen each other. Coil 1006 generates voltage 180° out of phase with coil 1007, so that the voltages are are made directly additive by merely reversing connections in the series or parallel combination of the two coils.

Figure 38:
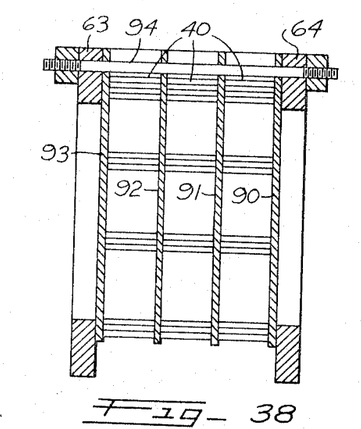
FIG. 38 is a view corresponding to FIG. 22 but showing a modification.

In a polyphase group, it is usually desired to have an interphase insulating sheet or plate between adjacent coil sides to prevent an interphase breakdown. FIG. 38 shows how four insulating sheets may be applied to three sets of coils 40 in a three phase winding. Rings 63 and 64 are similar to those previously shown, but the holes for the studs must be moved outward, since the three displaced coils overlap to cover holes such as 62 of FIG. 16. The stud should be insulated, as by sleeve 94, to prevent it from chafing the outer layer of the insulation of coils 40. Inner rings, such as 65 and 66 of FIG. 16, not shown in FIG. 38 for simplicity, may be applied in a similar manner.

Figure 22:
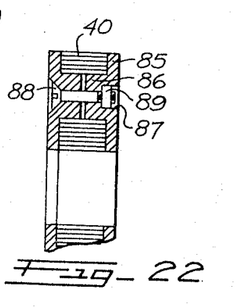
FIG. 22 is a longitudinal section of a stator using the end plate of FIGS. 20 and 21.
Figure 23:
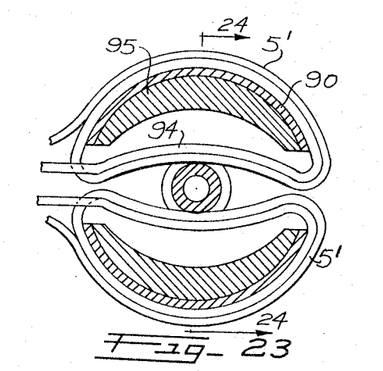
FIG. 23 is a view, taken on line 23—23 of FIG. 24, of a support for a two pole winding.
Figure 24:
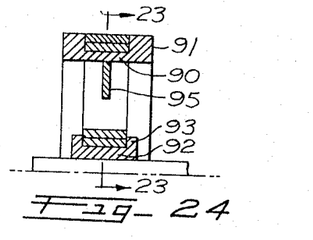
FIG. 24 is a view thereof taken on line 24—24 of FIG. 23.

The plates 90 to 93 may also be formed with cores as in FIGS. 20 and 22, with end plates 90 and 93 shaped like FIG. 20, and plates 91 and 92 having facing core projections like FIG. 22, and also projections facing plates 93 and 91 properly displaced in position.

Figure 39:
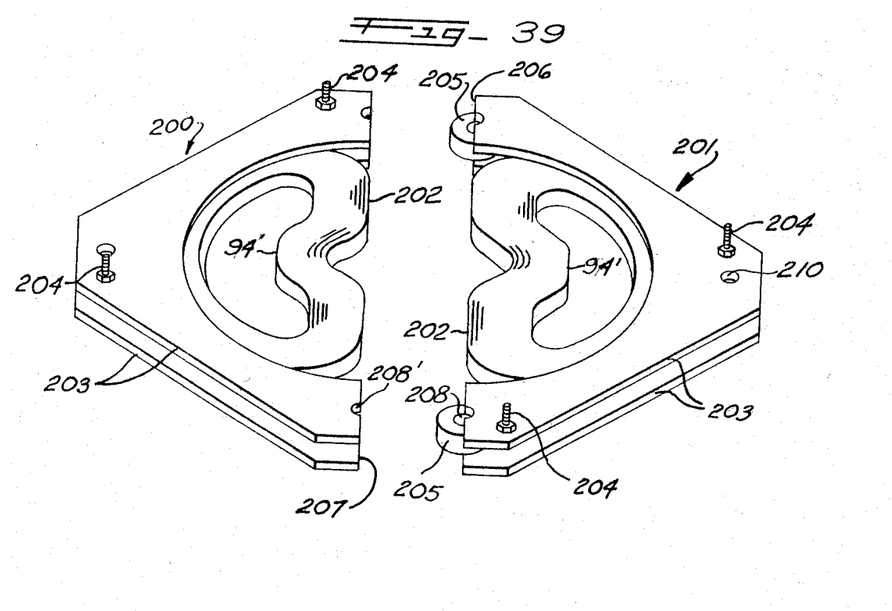
FIG. 39 is a perspective view of another armature of this invention; prior to assembly thereof.
Figure 40:
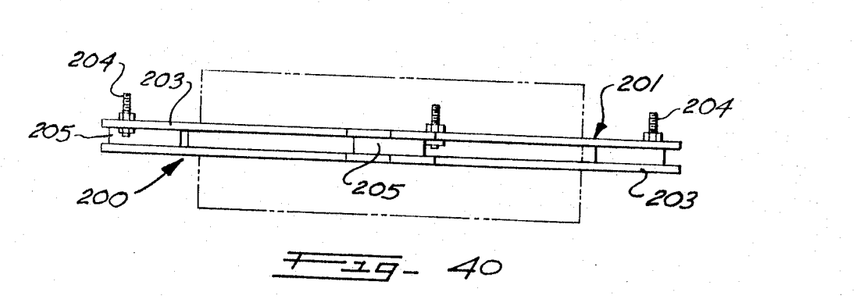
FIG. 40 is an elevational view of the assembled armature of FIG. 39.

Still another armature of my invention is shown in FIGS. 39 and 40. This armature can be used, for example, in the dynamo of FIG. 16, and has the advantage that it can be placed in position laterally, after both field structures have been positioned. This is because each coil is formed as a sub-assembly unit, and the individual coil units are assembled into a complete armature.

Figure 2:
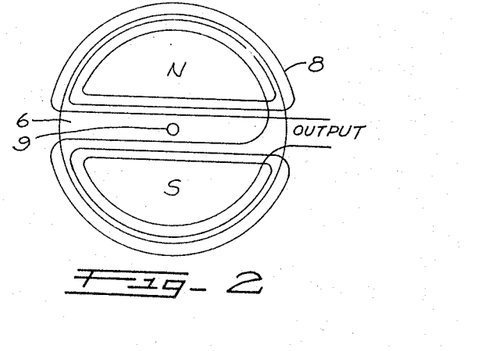
FIG. 2 is an end view of a field producing structure and the armature winding of FIG. 1.

Thus, there is shown a two-pole, single phase armature comprising separate sub-assembly units 200 and 201. Each unit comprises a ribbon conductor closely wound into a coil 202 similar to that shown in FIGS. 2 and 23, with the part 94', formed in a reverse curve to avoid the shaft. The ribbon conductor has its plane lying in the direction of field flux, and can be either a single ribbon, or a laminated construction as shown in FIG. 8.

Coil 202 is formed by winding the conductor on a form or core, and cementing the coil into a mechanical unit, as previously described. Each coil 202 then is clamped between a pair of end plates 203, cemented to the opposite sides thereof, to form the completed sub-assembly unit.

Each unit 200, 201 has a pair of winding terminals 204. In addition, one unit, here shown as 201 has a pair of spacing collars 205 projecting from the opposite ends 206 thereof, for insertion between the opposite ends 207 of the other unit 200. Collars 205 have openings 208 therethrough, and the ends 206 and 207 have mating half openings 208' alined therewith.

Accordingly, when it is desired to assemble the armature of FIGS. 39 and 40, the sub-assembly units 200 and 201 are interfitted as described above. Appropriate fastenings, not shown, then are extended through the openings 208 and 208', and through openings 210, and can be used to mount the armature in a housing, as in FIG. 16 for example. Thus, the units 200 and 201 interfit and cooperate to properly position coils 202 in the assembled armature, with the separately paired end plates 203 functioning like rings 63 and 64, but permitting lateral assembly of the armature.

While I have disclosed and described in detail only certain forms of my invention, that has been done by way of illustration only and those modifications and variations which will naturally occur to those skilled in the art are intended to be included in the appended claims.

Having fully disclosed and completely described my invention, what I claim as new is:

1. A dynamoelectric machine comprising:
   (a) a housing;
   (b) a shaft journalled for rotation in said housing about an axis;
   (c) multiple field-flux conducting structures in said housing secured to said shaft and including magnet means having poles spaced around said axis to provide an annular air gap path;
   (d) non-magnetic armature support means secured near its outer periphery to said housing and occupying said path between said structures;
   (e) armature windings comprising multiple-conductor turns spaced to provide flattened coils, said windings being rigidly secured to said supoprt means with protions of said turns located in said air gap path; and
   (f) said armature windings being grouped in multiply operative relationship on said support means and bonded thereto with cement means.

2. In a machine as set forth in claim 1, said armature support means comprising a highly electrically-conductive material.

3. In a machine as set forth in claim 1, said armature windings comprising conductors having wider and narrower flat surfaces and said wider surfaces being disposed parallel with the direction of flux in the air gaps, and each conductor comprising plural flat conductive ribbons bonded together in mutually-insulated relationship.

4. In a machine as set forth in claim 1, annular metal ring means fixed to said support means concentric with said annular path and located just out of the air gaps and adjacent to the portions of the turns which are within the air gaps.

5. In a machine as set forth in claim 1, said armature support means comprising two end plates with said coils disposed therebetween in operative mutual relationship and bonded thereto.

6. In a machine as set forth in claim 1, each coil having plural turns located inside each other in nature of a spiral, and each coil having two lengths of its outermost conductor disposed radially of said shaft, and the adjacent lengths of inner conductors being parallel with said outermost lengths, and all of said lengths comprising said portions of the turns.

7. A multiple-phase axial air-gap machine as set forth in claim 1, said machine including a separate armature assembly for each different phase and each assembly comprising armature windings secured on one of said support means, all of said armature assemblies being similar and being disposed side by side along said shaft and within said air gap between a pair of said structures, said armature assemblies being angularly displaced relative to each other.

8. A dynamoelectric machine comprising:
   (a) a housing;
   (b) a shaft journalled for rotation in said housing about an axis;

(c) multiple field-flux conducting structures in said housing secured to said shaft and including magnet means having poles spaced around said axis to provide an annular air gap path;

(d) non-magnetic armature support means secured near its outer periphery to said housing and occupying said path between said structures;

(e) armature windings comprising multiple-conductor turns spaced to provide flattened coils, said windings being rigidly secured to said support means with portions of said turns located in said air gap path; and (f) said armature support means comprising an assembly of spaced end plates receiving said shaft and having said coils disposed therebetween and including means for holding said plates together to secure said coils, said assembly being divided along a plane containing the axis of said shaft and passing between adjacent coils, and means to secure said plates together along said plane in precise registry to complete said assembly.

9. A dynamoelectric machine comprising:
   (a) a housing;
   (b) a shaft journalled for rotation in said housing about an axis;
   (c) multiple field-flux conducting structures in said housing secured to said shaft and including magnet means having poles spaced around said axis to provide an annular air gap path;
   (d) non-magnetic armature support means secured near its outer periphery to said housing and occupying said path between said structures;
   (e) armature windings comprising multiple-conductor turns spaced to provide flattened coils, said windings being rigidly secured to said support means with portions of said turns located in said air gap path; and
   (f) said armature support means comprising a plate disposed normal to said axis and including shoulder-like protrusions in the vicinity of directions, and said coils being mounted thereon.

10. In a machine as set forth in claim 9, said protrusions being arranged in pairs to support each coil, and said conductors being wound under tension on said pairs of protrusions.

11. A dynamolectric machine comprising, multiple field-producing structures having opposed proximate poles, a housing, means mounting said structures in said housing for rotation about an axis, an armature winding having portions positioned in the flux path between said structures, said armature winding comprising several turns of a conductor closely wound into a coil, said coil being mounted between end plates, and means securing said end plates to said housing and thereby mounting said armature coil between said structures, wherein said last-named means are adjustable to aline said armature with said structures.

12. A dynamoelectric machine comprising, multiple field-producing structures having opposed proximate poles, a housing, means mounting said structures in said housing for rotation about an axis, an armature winding having portions positioned in the flux path between said structures, said armature winding comprising several turns of a conductor closely wound into a coil, said coil being mounted between end plates, and means securing said end plates to said housing and thereby mounting said armature coil between said structures, wherein said last-named means are adjustable to move said armature lengthwise of said shaft between said structures.

13. A dynamoelectric machine comprising:
   (a) a housing;
   (b) a shaft journalled for rotation in said housing about an axis;
   (c) multiple field-flux conducting structures in said housing secured to said shaft and including magnet means having poles spaced around said axis to provide an annular air gap path;
   (d) non-magnetic armature support means secured near its outer periphery to said housing and occupying said path between said structures;
   (e) armature windings comprising multiple-conductor turns spaced to provide flattened coils, said windings being rigidly secured to said support means with portions of said turns located in said air gap path; and
   (f) a stator is provided on which said coils are mounted in a circle, said stator is formed in at least two parts, and said stator is mounted to said support means so that portions of the turns of the coils are located in said air gap.

14. A dynamoelectric machine of the axial air gap type comprising:
   (a) a housing;
   (b) a shaft journalled for rotation in said housing about an axis;
   (c) multiple field-flux conducting structures in said housing secured to said shaft and including magnet means having poles spaced around said axis to provide an annular air gap path normal to said axis;
   (d) armature windings comprising multiple-conductor turns shaped to provide flattened coils; and
   (e) a stator on which said coils are mounted in a circle, said stator being formed in at least two radially separable parts and being mounted on said housing so that portions of said turns are located in said air gap path.

References Cited by the Examiner
UNITED STATES PATENTS

| | | | |
|---|---|---|---|
| 271,928 | 2/1883 | Seeley | 310—268 |
| 351,906 | 11/1886 | Eickemeyer | 310—268 |
| 1,947,269 | 2/1934 | Leibing | 310—163 |
| 2,864,964 | 12/1958 | Kober | 310—268 |

MILTON O. HIRSHFIELD, *Primary Examiner.*

L. L. SMITH, *Assistant Examiner.*